United States Patent [19]

Dieck et al.

[11] 4,026,839

[45] May 31, 1977

[54] POLYPHOSPHAZENE POLYMER/SILICONE RUBBER BLENDS AND FOAMS THEREFROM

[75] Inventors: Ronald L. Dieck; Edwin J. Quinn, both of Lancaster, Pa.

[73] Assignee: Armstrong Cork Company, Lancaster, Pa.

[22] Filed: Aug. 30, 1976

[21] Appl. No.: 718,412

[52] U.S. Cl. .......................... 260/2.5 FP; 260/2 P; 260/2.5 R; 260/18 S; 260/30.4 R; 260/32.6 R; 260/33.6 R; 260/37 R; 260/824 R

[51] Int. Cl.$^2$ .......................................... C08J 9/10

[58] Field of Search ............... 260/41 P, 2 P, 2.5 R, 260/2.5 FP, 824 R

[56] References Cited

UNITED STATES PATENTS

| | | | |
|---|---|---|---|
| 3,856,712 | 12/1974 | Reynord et al. | 260/2 P |
| 3,856,713 | 12/1974 | Rose et al. | 260/2 P |

Primary Examiner—Morton Foelak

[57] ABSTRACT

This invention relates to blends of polyphosphazenes and silicone polymers. The blends of this invention can be formed into coatings, sheets or films or into flexible or semi-rigid foams. The blends are extremely fire retardant and produce low smoke loads, or essentially no smoke, when heated in an open flame.

8 Claims, No Drawings

POLYPHOSPHAZENE POLYMER/SILICONE RUBBER BLENDS AND FOAMS THEREFROM

DESCRIPTION OF THE INVENTION

This invention relates to blends of polyphosphazenes and silicone polymers. The blends are useful as fireretardant coatings, sheets, films or flexible or semi-rigid foams.

Some of the polyphosphazenes employed in the blends of this invention are described in copending application Ser. No. 661,862, filed Feb. 27, 1976, hereby incorporated by reference.

The poly(aryloxyphosphazene) copolymers described in application Ser. No. 661,862 are characterized by repeating

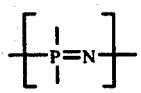

units which contain substituted aryloxy-substituents (preferably substituted in the para position) on the phosphorous atoms in nonregular fashion and which can be represented by the following formulas:

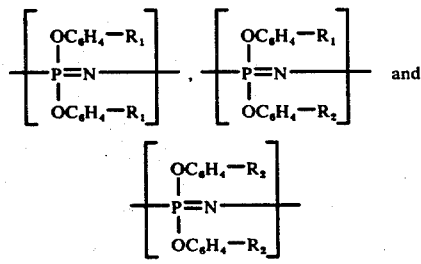

wherein $R_1$ and $R_2$ are the same or different and are hydrogen, a $C_1$ - $C_{10}$ linear or branched alkyl radical, or a $C_1$ - $C_4$ linear or branched alkoxy radical substituted on any sterically permissible position on the phenoxy group, with the proviso that when $R_2$ is alkoxy and when copolymers are to be prepared, $R_1$ and $R_2$ are different. Examples of $R_1$ and $R_2$ include ethoxy, methoxy, isopropoxy, n-butoxy, methyl, ethyl, n-propyl, isopropyl, sec-butyl, tert-butyl, tert-pentyl, 2-ethylhexyl and n-nonyl.

It is to be understood that when $R_1$ is the same as $R_2$, homopolymers are formed. Further, it is to be understood that while it is presently preferred that all $R_1$'s are the same and all $R_2$'s are the same, the $R_1$'s can be mixed and the $R_2$'s can be mixed. The mixtures may be mixtures of different alkyl radicals or mixtures of different ortho-, meta- and para- isomers. One skilled in the art readily will recognize that steric hindrance will dictate the propriety of using relatively bulky groups in the para-position on the phenoxy ring since as set forth hereinafter the polymers are made by reacting a substituted metal phenoxide with a chlorine atom substituted phosphorous atom. Desirably, groups which sterically inhibit this reaction should be avoided. Absent the foregoing proviso, the selection of the various $R_1$'s and $R_2$'s will be apparent to anyone skilled in the art based upon this disclosure.

For the sake of simplicity, the polymers used to prepare the blends of the invention which contain the above three repeating units may be represented by the formula $[NP(OC_6H_4-R_1)_a(OC_6H_4-R_2)_b]_n$, wherein $n$ is from about 20 to about 2000 or more, and wherein $a$ and $b$ are greater than zero and $a+b=2$.

The above described polymers, as well as those containing reactive sites designated as W below, may be crosslinked and/or cured at moderate temperatures (for example, 200°–350° F.) by the use of free radical initiators, for example, peroxides, using conventional amounts, techniques and processing equipment.

The copolymers used to prepare the blends of this invention may contain small amounts of randomly distributed repeating units in addition to the repeating units described above. Examples of these additional repeating units are:

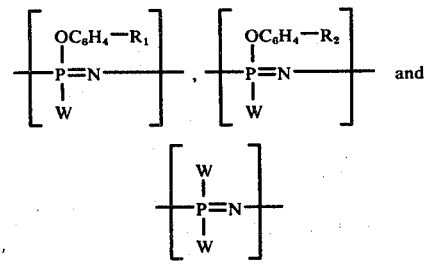

wherein W represents a group capable of a crosslinking chemical reaction, such as, an olefinically unsaturated, preferably ethylinically unsaturated monovalent radical, containing a group capable of further reaction at relatively moderate temperatures, and the ratio W: $[(OC_6H_4-R_1)+(-OC_6H_4-R_2)]$ is less than about 1:5. For the sake of simplicity, the copolymers of this invention which are further reactive may be represented by the formula $[NP(OC_6H_4-R_1)_a(OC_6H_4-R_2)_b(W)_c]_n$, wherein W, $R_1$, $R_2$, $n$, $a$ and $b$ are as set forth above, and wherein $a+b+c=2$. Examples of W are $-OCH=CH_2$; $-OR_3CH=CH_2$;

$OR_3CF=CF_2$ and similar groups which contain unsaturation, where $R_3$ is any aliphatic or aromatic radical, especially $-CH_2-$. These groups are capable of further reaction at moderate temperatures (for example, 200°–350° F.) in the presence of free radical initiators, conventional sulfur curing or vulcanizing additives known in the rubber art or other reagents, often even in the absence of accelerators, using conventional amounts, techniques and processing equipment.

It is also possible to use as W in the above formulas, monovalent radicals represented by the formulas (1) $-OSi(OR^4)_2R^5$ and other similar radicals which contain one or more reactive groups attached to silicon; (2) $-OR^6NR^6H$ and other radicals which contain reactive -NH linkages. In these radicals $R^4$, $R^5$ and $R^6$ each represent aliphatic, aromatic and acyl radicals. Like the groups above, these groups are capable of further reaction at moderate temperatures in the presence of compounds which effect crosslinking. The presence of a catalyst to achieve a cure is often desirable. The introduction of groups such as w into polyphosphazene polymers is shown in U.S. Pat. Nos. 3,888,799; 3,702,833 and 3,844,983, which are hereby incorporated by reference.

In general, the processability, smoke production, glass transition temperature and a number of other properties of the polymers are affected by the identity of $R_1$ and $R_2$. In homopolymers, e.g., where $R_1=R_2$ as in copolymers, an increase in the size of $R_1$ causes a decrease in the open flame smoke generation with a concurrent increase in flammability. However, these changes result in more flexible films and compositions of enhanced foamability. Further, as the mole percent cent $R_1$ approaches 100 per cent, the crystallinity of the copolymers increases and their ability to be foamed diminishes. In copolymers containing the group W, it has been found that when the mole percent of W increases, the degree of cross-linking increases and the ability to be foamed diminishes. Preferred polymers in accordance with the present invention are those containing both $R_1$ and $R_2$. It is contemplated that these copolymers contain a mole ratio of a:b of at least about 1:6 and up to about 6:1, and preferably between about 1:4 and 4:1. It is also contemplated that the mole ratio of c:(a+b) will be less than about 1:5, preferably from about 1:50 to about 1:10.

In one embodiment, these copolymers may be prepared in accordance with the process described in U.S. Pat. No. 3,370,020 to Allcock et al, which description is incorporated hereby by reference. A detailed description, preparatory processes and examples of suitable polyphosphazenes are set forth in said application Ser. No. 661,862.

The silicone elastomers which can be utilized in the blends of this invention are poly(organosiloxane), which is preferably completely soluble in benzene, may have a structure comprising, and preferably consisting essentially of, repeat units of structure

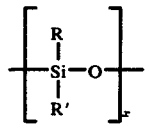

where R and R', which may be the same or different, are hydrocarbyl radicals or substituted hydrocarbyl radicals and x is an integer. For example, R and R' may be selected from alkyl radicals, e.g., methyl, ethyl, propyl, butyl and pentyl; aryl radicals, i.e., phenyl; aralkyl radicals, e.g. benzyl; alkaryl radicals, e.g., tolyl; alkenyl radicals, e.g., vinyl, allyl and methallyl, and substituted alkyl radicals, e.g., chloromethyl, chloropropyl and trifluoropropyl.

Preferably, both of the groups R and R' are hydrocarbyl groups and they may both suitably be alkyl groups especially methyl. Minor amounts of monoorganosiloxy units $R''SiO_{2/3}$, where R'' is an organic radical, may be present in the poly(organosiloxane).

The average molecular weight of the poly(organosiloxane) may vary widely, for example, from 20,000 to 5,000,000 or even greater but is preferably within the range 40,000 to 200,000. Poly(organosiloxanes) having molecular weights outside these ranges may be used if desired.

The poly(organosiloxane) elastomers are vulcanizable, i.e. crosslinkable, and if the crosslinking mechanism for a particular silicone elastomer employed is distinct from the curing process for the polyphosphazene a suitable silicone elastomer curing agent is incorporated into the blends of a type and in an amount conventionally employed in the silicone elastomer technology where cross-linking of the poly(organo siloxane) is to be effected by reaction with a cross-linking agent. The cross-linking agent should possess two or more groups which will react with functional groups on the poly(organo siloxane). The poly(organo siloxane) should contain two or more such functional groups. Examples of such functional groups attached directly to silicon atoms in the poly(organo siloxane) include hydrogen, hydroxyl, alkoxy, e.g. methoxy, ethoxy and propoxy, alkenyl, e.g. vinyl and allyl, and acyloxy, e.g. acetoxy. Such functional groups may be attached to silicon atoms at the ends of the poly(organo siloxane) chain, or to in-chain silicon atoms, or to both types of silicon atoms. Suitably the poly(organo siloxane) may have one of the following general structures:

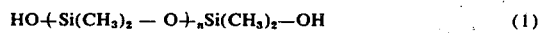 (1)

 (2)

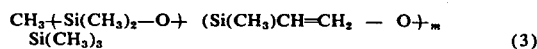 (3)

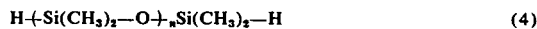 (4)

and

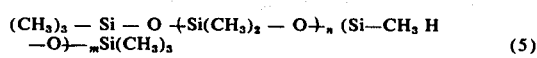 (5)

The aforementioned poly(organo siloxanes) are well known in the art and are curable by free radical catalyst. Poly(organo siloxanes) or types (2) and (3) are preferred since unsaturated poly(organo siloxane) are particularly curable with the free-radical generating curing agents which cure the polyphosphazenes.

Suitable cross-linking agents reactive with hydroxyl groups attached directly to silicon, that is silanol groups, are well known in the art and are described, inter alia, in British Patent Nos. 687,759; 764,246; 841,825; 844,128; 835,790; 851,578; 905,364; 975,603 and 999,123. Suitable cross-linking agents include alkyl silicates and alkyl polysilicates, e.g. methyl silicate, ethyl silicate, propyl silicate, butyl silicate and ethyl poly-silicate; methoxy ethyl silicate and amino ethyl silicate; trialkoxy silanes, e.g. methyl triethoxy silane and phenyl trimethoxy silane; triacyloxy silanes, e.g. methyl triacetoxy silane; methyl tris(benzamide) silane and methyl tris (butyl amino) silane. The preferred cross-linking agents are ethyl silicate, ethyl polysilicate and methoxy ethyl silicate.

The cross-linking reaction may be assisted by the presence in the composition of catalyst, e.g. bases or metal salts. Suitable bases include amines, especially primary amines. Where the catalyst is a metal salt, metal salts of tin are preferred, although salts of other metals may be used. For example, the metal salt may be dibutyl tin dilaurate, tin naphthenate, lead octanoate, stannous octoate tin oleate and iron stearate.

Where the poly(organo siloxane) comprises a plurality of alkenyl groups, which may be terminal groups or which may alternatively or in addition be at least some of the groups R and/or R' on the silicon atoms in the chain of the poly(organo siloxane), the cross-linking agent may be a compound containing a plurality of groups reactive with the ethylenically unsaturated groups. For example, the cross-linking agent may be an alkyl hydrogeno polysiloxane, e.g. methyl hydrogeno polysiloxane and the catalyst may be, for example, chloroplatinic acid. The use of methyl hydrogeno siloxanes as cross-linking agent for alkenyl group containing poly(organo siloxanes) is described in British Patent Nos. 1,027,051 and 1,289,217.

Other suitable combinations of poly(organo siloxane) and cross-linking agent include a poly(organo siloxane) containing halogenated hydrocarbon groups and an aminosilane cross-linking agent, and a poly(organo siloxane) containing hydroxyl groups and a cross-linking agent which is a siloxane having at least three units per molecule of formula $R^6HSiO$ where $R^6$ is a monovalent hydrogen radical containing less than seven carbon atoms. The use of methyl hydrogenosiloxanes as cross-linking agent for silanol containing poly(organo siloxanes) is described in British Patent Nos. 686,575; 804,199 and 841,825.

The preferred poly(organo siloxanes) are unsaturated polydiorganosiloxanes having a formula $X[R_2SiO)_m(RR''SiO)-1-m]x\ X'$ wherein R is a monovalent radical having a maximum of 18 carbon atoms including a hydrogen atom; an alkyl radical such as methyl, ethyl, propyl, isopropyl, octyl, cyclohexyl, cyclopentyl, dodecyl and octadecyl; haloalkyl such as 3-chloropropyl, 3,3,3-trifluoropropyl, perfluoroalkylethyl radicals, chloromethyl and bromooctadecyl; aryl radicals such as phenyl, tolyl, xylyl, 3-ethylphenyl, xenyl, naphthyl, anthracyl and 3,4-methylethylphenyl; haloaryl radicals such as 2,4-dichlorophenyl, dibromoxenyl, alpha,alpha-alpha-trifluorotolyl and iodonaphthyl and aralkyl radicals such as benzyl, 2-phenyloctyl, 2-phenylethyl, 2-phenylpropyl and 3-methyl-2-(4-isopropylphenyl) heptyl; X is an endblocking group of $R'R_2SiO$ — or HO — (hydroxyl); X' is an endblocking group of $R'R_2Si$- or H(hydroxyl); R' is an R radical, vinyl or allyl and R'' is vinyl or allyl. At least 50 percent of the R radicals are lower alkyl radicals having less than 3 carbon atoms and include methyl and ethyl, preferably methyl. It is also preferred that the R radicals are at least 90 percent lower alkyl.

In the formula for the polydiorganosiloxane, m and 1-m represent the mole ratio of each type of diorganosiloxane unit in the polydiorganosiloxane. Thus, m represents the mole ratio of $R_2SiO$ units in the polydiorganosiloxane and 1m represents the mole ratio of $RR'\lambda'SiO$ units in the polydiorganosiloxane. m preferably has a value from 0.75 to 0.85 inclusive and 1-m preferably has a value from 0.15 to 0.25. Also, in the above formula for the polydiorganosiloxane x represents the total number of diorganosiloxane units in the polydiorganosiloxane and has a value sufficient to provide an appropriate molecular weight. The polydiorganosiloxanes can be prepared by methods known in the art such as by polymerizing a mixture of the cycle $(R_2SiO)y$ and cyclic $(RR''SiO)y$ where y is 3 or 4 with a basic catalyst such as potassium silanolate. The polydiorganosiloxanes can be random copolymers, block copolymers and any of the possible forms which exist between the true random copolymer and true block copolymer. The polydiorganosiloxane can be hydroxyl or triorganosilyl endblocked. Because the amount of endblocking is small in these high molecular weight polymers, it has little or no effect on polydiorganosiloxane.

Particularly preferred poly(organosiloxanes) are phenylvinylpolydimethylsiloxanes or methylvinylpolydimethylsiloxanes which contain minor amounts of vinyl groups i.e. having up to about 25 mole percent of organosiloxane units containing vinyl radicals. Preferably the vinyl groups are present in the order of about 0.15 to 0.56 mole percent vinyl groups.

The blends of this invention are capable of formulation over a wide range of proportions. Preferably the blend should comprise between about 15% to about 85% by weight of the polyphosphazene and about 85% to about 15% by weight of the poly(organosiloxane), based on the mixture of the polyphosphazene and the poly(organosilane). More preferably amounts of the above between about 20% to about 80% by weight are employed.

The novel mixtures of this invention, as mentioned above, have good thermal stability. The mixtures are soluble in specific organic solvents such as tetrahydrofuran, benzene, xylene, toluene, dimethylformamide and the like and can be formed into films from solutions of the copolymers by evaporation of the solvent. The blends are water resistant at room temperature and do not undergo hydrolysis at high temperatures. The blends may be used to prepare films, fibers coatings, molding compositions and the like. They may be additionally blended with such additives as antioxidants, ultraviolet light absorbers, lubricants, plasticizers, dyes, pigments, fillers such as litharge, magnesia, calcium carbonate, furnace black, alumina trihydrate and hydrated silicas, other resins, etc., without detracting from the scope of the present invention.

The blends may be used to prepare foamed products which exhibit excellent fire retardance and which produce low smoke levels, or essentially no smoke when heated in an open flame. The foamed products may be prepared from filled or unfilled formulations using conventional foam techniques which chemical blowing agents, i.e. chemical compounds stable at original room temperature which decompose or interact at elevated temperatures to provide a cellular foam. Suitable chemical blowing agents include:

| Blowing Agent | Effective Temperature Range ° C. |
|---|---|
| Azobisisobutyronitrile | 105–120 |
| Azodicarbonamide (1,1-azobisformamide) | 100–200 |
| Benzenesulfonyl hydrazide | 95–100 |
| N,N'-dinitroso-N,N'-dimethyl terephthalamide | 100 |
| Dinitrosopentamethylenetetramine | 130–150 |
| Ammonium carbonate | 58 |
| p,p'-oxybis-(benzenesulfonylhydrazide) | 100–200 |
| Diazoaminobenzene | 84 |
| Urea-biuret mixture | 90–140 |
| 2,2'-azo-isobutyronitrile | 90–140 |
| Azohexahydrobenzonitrile | 90–140 |
| Diisobutylene | 130 |
| 4,4'-diphenyldisulfonylazide | 110–130. |

Typical foamable formulations include:

| | |
|---|---|
| Polyphosphazene-Silicone elastomer blend | 100 parts |
| Filler (e.g., alumina trihydrate) | 0–100 phr |
| Stabilizer (e.g., magnesium oxide) | 2.5–10 phr |
| Proessing aid (e.g., zinc stearate) | 2.5–10 phr |
| Plasticizer resin (e.g., Cumar P-10, coumarone indene resin) | 0–50 phr |
| Blowing agent (e.g., 1,1'-azobisformamide) | 10–50 phr |
| Activator (e.g., oil-treated urea) | 10–40 phr |
| Peroxide curing agent (e.g., 2,5-dimethyl-2,5-di(t-butylperoxy) hexane) | 2.5–10 phr |
| Peroxide curing agent (e.g., benzoyl peroxide) | 2.5–10 phr. |

While the above are preferred formulation guidelines, obviously some or all of the adjuvants may be omitted, replaced or other functionally equivalent materials or other adjuvants such as silicone elastomer vulcanizing agent, or the proportions varied, within the skill of the art of the foam formulator.

In one suitable process, the foamable ingredients are blended together to form a homogeneous mass; for example, a homogeneous film or sheet can be formed on a 2-roller mill, preferably with one roll at ambient temperature and the other at moderately elevated temperature, for example, 100°–120° F. The homogeneous foamable mass can then be heated, to provide a foamed structure; for example, by using a mixture of a curing agent having a relatively low initiating temperature, such as benzoyl peroxide, and a curing agent having a relatively high initiating temperature, such as 2,4-dimethyl-2,5-di(tibutylperoxy) hexane, and partially pre-curing in a closed mold for about 6–30 minutes at 200°–250° F., followed by free expansion for 30–60 minutes at 300°–350° F. In the alternative the foaming may be accomplished by heating the foamable mass for 30–60 minutes at 300°–250° F. using a high temperature or low temperature curing agent, either singly or in combination. One benefit of utilizing the "partial pre-cure" foaming technique is that an increase in the molecular weight of the foamable polymer blend prior to the foaming step enables better control of pore size and pore uniformity in the foaming step. The extent of "pre-cure" desired is dependent upon the ultimate foam characteristics desired. The desired foaming temperature is dependent on the nature of the blowing agent and the crosslinkers present. The time of heating is dependent on the size and shape of the mass being foamed. The resultant foams are generally salmon pink in appearance, and vary from flexible to semirigid, depending upon the glass transition temperature of polymers employed in the foam formulation, that is to say, the lower the glass transition of the polymers the more flexible will be the foam produced therefrom. As indicated, inert, reinforcing or other fillers such as alumina trihydrate, hydrated silicas or calcium carbonate can be added to the foams and the presence of these and other conventional additives should in no way be construed as falling outside the scope of this invention.

Also, as mentioned above, blends of this invention can be crosslinked at moderate temperatures by conventional free radical and/or sulfur curing techniques when minor amounts of unsaturated groups W are present in the phosphazene polymer backbone. The ability of these blends to be cured at temperatures below about 350° F. makes them particularly useful as potting and encapsulation compounds, sealants, coatings and the like. These blends are also useful for preparing crosslinked foams which exhibit significantly increased tensile strengths over uncured foams. These blends are often crosslinked in the presence of inert, reinforcing or other fillers and/or pigments and the presence of these and other conventional additives are deemed to be within the scope of this invention.

If desired, where the silicone elastomer contains crosslinking functionality other than unsaturation, it may be desirable to incorporate known vulcanizers or crosslinkers for that functionality in conventional amounts. By the selection of such crosslinkers, one or two stage cures may be achieved as desired to modify the foaming, molding or coating characteristics of the blends.

The following examples are set forth for purposes of illustration only and are not to be construed as limitations of the present invention except as set forth in the appended claims. All parts and percentages are by weight unless otherwise indicated.

In the following examples Oxygen Index (OI) was determined according to the procedure described in ASTM D-2863-74, "Flammability of Plastics Using the Oxygen Index Method". By this method, foam samples, which are 6 × 0.5 × 0.25 in., are burned and the oxygen index under a specific set of conditions is measured. It has been shown that this technique actually measures the lowest oxygen concentration in a atmosphere which will just prevent sustained burning of a to-ignited sample (see Fenimore et al., *Combustion and Flame*, 10, 135 (1966). The oxygen index values also have been related to the temperature at which a mixture of fuel and a controlled flow of oxygen will just burn when the fuel is composed of volatile pyrolytic products or fragments (see Johnson et al., *Rubber Age*, 107 (No. 5) 29 (1975).

In the following examples foam samples were cut and tested according to the standard procedure established in ASTM D-2843-70, commonly called the Rohm & Haas XP2 Smoke Chamber Test. The smoke value per gram (SV/g) was obtained by dividing the Rohm & Haas smoke result by the sample weight of the 1 inch cube that was tested.

Smoke-evolution properties of foams were also evaluated by using an Aminco-NBS Density Chamber (Model 4-5800, Aminco-NBS Smoke Density Chamber, American Instrument Co.), as described by Gross et al., "A Method of Measuring Smoke Density from Burning Materials", ASTM SPT-422 (1967). Samples were tested using the flaming and non-flaming test modes. This small scale test subjects a sample to the two general conditions which prevail in the majority of "real" fires and especially in tunnel tests. In the tests the maximum specific optical density Dm, corrected for soot deposits on the cell windows was measured. The average value of Dm(corr) using both the flaming and non-flaming modes was also calculated. An average Dm(corr) value of 450 as determined by the NBS Smoke Density Chamber has been adopted as a regulation value by the U.S. Department of Health, Education and Welfare, see HEW Publication No. (HRA) 74-4000 (1974). Generally, NBS smoke values of 450 or less are normally required in those fire or code regulations restricting smoke evolution.

The following formulation and method were employed in Examples 1–5:

|  |  | Parts by Weight |
|---|---|---|
| Cup A | Polyphosphazene | 5 |
|  | Silicone elastomer | 5 |
| Cup B | 1,1'-azobisformamide | 3 |
|  | oil treated urea (activator) | 2.3 |
|  | magnesium oxide | 0.5 |
|  | zinc stearate | 0.5 |
|  | cumarone indene resin (Cumar P-10) | 0.2 |
|  | 2,5-dimethyl-2,5 di t-butyl peroxyhexane | 0.5 |
|  | benzoyl peroxide (78% active) | 0.5 |
|  | Alumina trihydrate | Varied. |

Polymers were blended on a two-roll mill with one roll at 120°–140° F. and the other at ambient conditions. Samples in Cup A were blended for 15 minutes to ensure homogeneous mixing. The ingredients in Cup B were added to the polymer blend on the research mill. This was allowed to mix for an additional 15 minutes.

The unexpected blend was then precured in a press for 12 minutes at a temperature of 220° F. and pressure of 2000 psi. Finally, the precured pad was free expanded in a circulating air oven for 30 minutes at 300° F.

EXAMPLE 1

Using the formulation and method described above $[Np(OC_6H_5) OC_6H_4$-4-sec $C_4H_9)]$ (see Example 20 of application Ser. No. 661,862) and a phenyl vinyl polydimethylsiloxane (Silastic 675U, a low temperature serviceability silicone rubber which when press molded 100 parts to 13 parts of 50% 2,4-dichlorobenzoyl peroxide five minutes at 116° C. has the following properties in a 0.075 inch thick slab; cure - 24 hours at 250° C.; Durometer hardness, Shore A, 75 ± 5, tensile strength-psi min., 650; Elongation-% max., 20; shrinkage, percent-2.85 ± 0.35) were blended with the ingredients in Cup B and 2.5g of alumina trihydrate. The mixture was foamed and resulted in a flexible salmon pink foam. Rohm and Haas XP2 Smoke Chamber tests on the sample gave the value - Maximum Smoke Density = 23; SV/g = 13.

EXAMPLE 2

Using the formulation and method described above, $[NP(OC_6H_5) (OC_6H_4$-4-sec $C_4H_9)]_n$ and Silastic 675U (both described in Example 1) were blended with the ingredients in Cup B and 5.0 g of Hydral-710. The mixture was foamed and resulted in a flexible, salmon pink foam. Rohm and Haas XP2 Smoke Chamber tests on the sample gave the value - Maximum Smoke Density = 14; SV/g = 7.

EXAMPLE 3

Using the formulation and method described above, $[NP(OC_6H_5) (OC_6H_4$-4-sec $C_4H_9)]_n$ and Silastic 675U (both described in Example 1) were blended with the ingredients in Cup B and 7.5g of alumina trihydrate. The mixture was foamed and resulted in a flexible, salmon pin foam. Rohm and Haas XP2 Smoke Chamber tests on the sample gave the value - Maximum Smoke Density = 17; SV/g = 11.

EXAMPLE 4

Using the formulation and method described above, $[NP(CO_6H_5) (OC_6H_4$-4-sec $C_4H_9)]_n$ and Silastic 675U (both described in Example 1) were blended with the ingredients in Cup B and 10g of alumina trihydrate. The mixture was formed and resulted in a flexible, salmon pink foam. Rohm and Haas XP2 Smoke Chamber test on the same gave the value - Maximum Smoke Density = 18; SV/g = 8.

EXAMPLE 5

Using the recipe and method described above, $[NP(OC_6H_4$-4-$OCH_3) (OC_6H_5)]_n$ (see Example 1 of application Ser. No. 661,862) and Silastic 675U were blended with the ingredients in Cup B and 7.5g of alumina trihydrate. The mixture was foamed and resulted in a flexible, salmon pink foam. Rohm and Haas XP2 Smoke Chamber tests on the sample gave the value - Maximum Smoke Density = 25; SV/g = 19.

In Examples 6 thru 11 the following general formulations was employed:

| Cup A | Parts by Weight |
|---|---|
| $[NP(OC_6H_4$-4-$OCH_3) (OC_6H_4$-4-sec $C_4H_9)]_n$ (see Example 7 of application Serial No. 661,862) | X |
| Silicone elastomer (Silastic 675U) | Y |
| Cup B | |
| Alumina trihydrate | 10 |
| 1,1'-azobisformamide | 2 |
| oil treated urea | 0.5 |
| magnesium oxide | 0.5 |
| zinc stearate | 1 |
| cumarone indene resin (Cumar P-10) | 0.2 |
| 2,5-dimethyl-2,5-di t-butyl peroxyhexane | 0.6 |
| benzoyl peroxide (78% active) | 0.2 |
| dicumyl peroxide | 0.1. |

The method employed in the following Examples is the method described in conjunction with Examples 1–5.

EXAMPLE 6

Using the method and formulation above, where $x = 8.0$g and $y = 2.0$g, the polymers and ingredients were blended and foamed. The resulting foams were flexible and salmon pink in color. NBS Smoke Chamber testing in the flaming mode resulted in the value DM(corr) = 121; SV/g = 9; Oxygen index (O.I.) = 39.9.

EXAMPLE 7

Using the method and formulation above, where $x = 7.0$g and $y = 3.0$g, the polymers and ingredients were blended and foamed. The resulting foams were flexible and salmon pink in color.

EXAMPLE 8

Using the method and formulation above, where $x = 6.0$g and $y = 4.0$g, the polymers and ingredients were blended and foamed. The resulting foams were flexible and salmon pink in color. NBS Smoke Chamber testing in the flaming mode resulted in the value DM(corr) = 90; SV/g = 6; O.I. = 45.6.

EXAMPLE 9

Using the method and formulation above, where $x = 5.0$g and $y = 5.0$g, the polymers and ingredients were blended and foamed. The resulting foams were flexible and salmon pink in color. NBS Smoke Chamber testing in the flaming mode resulted in the value DM(corr) = 94; SV/g = 6; O.I. = 48.3.

EXAMPLE 10

Using the method and formulation above, where $x = 4.0$g and $y = 6.0$g, the polymers and ingredients were blended and foamed. The resulting foams were flexible and salmon pink in color. NBS Smoke Chamber testing in the flaming mode resulted in the value Dm(corr) = 81; SV/g = 6; O.I. 49.3.

EXAMPLE 11

Using the method and formulation above, where $x = 2.0$g and $y = 8.0$g, the polymers and ingredients were blended and foamed. The resulting foams were flexible and salmon pink in color. NBS Smoke Chamber testing in the flaming mode resulted in the value DM(corr) = 103; SV/g = 6; O.I. = 53.0.

Other resins and adjuvants such as those described hereinabove may be substituted for those of the Examples. Likewise, the exemplified procedures may be modified as will be apparent to those skilled in the art.

Omission of blowing agents provides non-cellular cured products.

According to the provision of the Patent Statutes there are described the invention and what are now considered to be its best embodiments. However, within the scope of the appended claims, it is to be understood that the invention can be practiced otherwise than as specifically described.

What is claimed is:

1. A foamed blend comprising:
    A. a polyphosphazene comprising randomly distributed repeating units represented by the formulas:

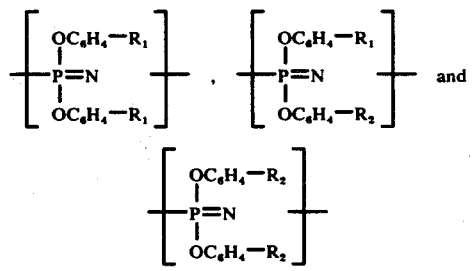

wherein $R_1$ and $R_2$ are the same or different and are hydrogen, a $C_1$-$C_{10}$ linear or branched alkyl radical, or a $C_1$-$C_4$ linear or branched alkoxy radical substituted on any sterically permissible position on the phenoxy group,
    B. a poly(organosiloxane) elastomer,
    C. said polymer (A) being present in an amount of about 15% to about 85% by weight and said polymer (B) being present in an amount of about 85% to about 15% by weight, based on the combination of (A) and (B).

2. A foamed blend, as in claim 1, where the poly(organosiloxane) (B) contains vinyl or allyl groups.

3. A foamed blend, as in claim 2, where the poly(organosilane) (B) contains vinyl groups.

4. A foamed blend, as in claim 1, wherein the poly(organosiloxane) is a phenyl vinyldimethylpolysiloxane.

5. A foamed blend, as in claim 1, where the polyphosphazene (A) (I) has randomly distributed repeating units represented by the formulas:

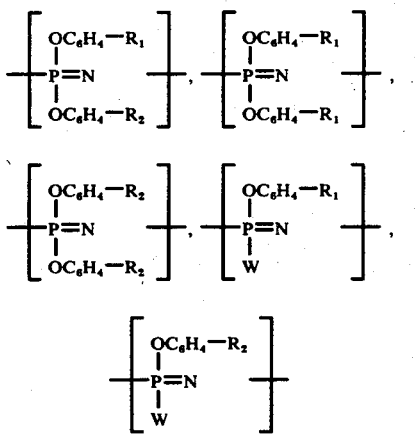

where W is a substituent capable of a crosslinking chemical reaction.

6. A foamed blend, as in claim 5, where the poly(organosiloxane) (B) contains vinyl or allyl groups.

7. A foamed blend, as in claim 6, where the poly(organosiloxane) (B) contains vinyl groups.

8. A foamed blend, as in claim 5, wherein the poly(organosiloxane) is a phenyl vinyldimethylpolysiloxane.

* * * * *

UNITED STATES PATENT OFFICE
CERTIFICATE OF CORRECTION

PATENT NO. : 4,026,839
DATED : May 31, 1977
INVENTOR(S) : Ronald L. Dieck et al

It is certified that error appears in the above-identified patent and that said Letters Patent are hereby corrected as shown below:

Column 1, lines 7 and 8, the word "fireretardant" should read --fire retardant--.

Column 2, line 65, "w" should read --W--.

Column 3, line 10, the word "cent" 1st occurrence should read --of--.

Column 4, line 31, the word "or" should read --of--.

Column 5, line 18, that portion of the formula reading "[R$_2$" should read --[(R$_2$--; line 45, "lm" should read --1-m--; lines 45 and 46, the formula "RR'ʎ'SiO" should read --RR"SiO--; line 54, the word "cycle" should read --cyclic--.

Column 6, line 33, the word "which" should read --with--.

Column 7, line 14, that portion of the formula reading "2,4-" should read --2,5---.

Column 8, line 11, the word "to-ignited" should read --top-ignited--.

UNITED STATES PATENT OFFICE
CERTIFICATE OF CORRECTION

PATENT NO. : 4,026,839
DATED : May 31, 1977
INVENTOR(S) : Ronald L. Dieck et al

It is certified that error appears in the above-identified patent and that said Letters Patent are hereby corrected as shown below:

Column 9, line 48, that portion of the formula reading "$(CO_6H_5)$" should read --$OC_6H_5$--.

Column 9, line 9, that portion of the formula reading "Np" should read --NP--.

Signed and Sealed this

Twentieth Day of September 1977

[SEAL]

Attest:

RUTH C. MASON
*Attesting Officer*

LUTRELLE F. PARKER
*Acting Commissioner of Patents and Trademarks*